US012102602B2

(12) United States Patent
Wurst et al.

(10) Patent No.: US 12,102,602 B2
(45) Date of Patent: Oct. 1, 2024

(54) CAPSULE FILLING MACHINE

(71) Applicant: Harro Hoefliger Verpackungsmaschinen GmbH, Allmersbach im Tal (DE)

(72) Inventors: Reiner Wurst, Allmersbach im Tal (DE); Florian Huhnen, Allmersbach im Tal (DE); Steffen Gall, Allmersbach im Tal (DE); Jonathan Cocks, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 18/322,390

(22) Filed: May 23, 2023

(65) Prior Publication Data

US 2023/0372200 A1 Nov. 23, 2023

(30) Foreign Application Priority Data

May 23, 2022 (EP) .................................. 22 174 944

(51) Int. Cl.
*A61J 3/07* (2006.01)

(52) U.S. Cl.
CPC .................................... *A61J 3/074* (2013.01)

(58) Field of Classification Search
CPC ........ A61J 3/074; A61J 2200/74; Y10S 53/90
See application file for complete search history.

(56) References Cited

U.S. PATENT DOCUMENTS

| | | | | |
|---|---|---|---|---|
| 5,617,710 | A * | 4/1997 | Goossens | B29C 66/12841 53/329 |
| 6,434,911 | B1 * | 8/2002 | Yamamoto | B65G 47/256 53/53 |
| 6,499,279 | B1 * | 12/2002 | Yamamoto | A61J 3/074 53/328 |
| 8,108,068 | B1 * | 1/2012 | Boucher | G01G 17/00 700/240 |
| 9,021,772 | B2 * | 5/2015 | Bedetti | A61J 3/074 53/53 |
| 11,376,196 | B2 * | 7/2022 | Ribani | A61J 3/074 |
| 11,953,368 | B2 * | 4/2024 | Masotti | G01G 17/04 |
| 2021/0177700 | A1 * | 6/2021 | Ribani | B65B 1/06 |

* cited by examiner

*Primary Examiner* — Andrew M Tecco
(74) *Attorney, Agent, or Firm* — Walter Ottesen, P.A.

(57) ABSTRACT

A capsule filling machine has a frame and a rotary plate. A processing station includes a weighing device for capsules. The frame has a table and feet for setting down on a floor. The weighing device has a weighing frame provided with dedicated weighing-frame feet. The table has a cutout with a peripheral edge, the weighing device being positioned in the cutout at a distance from its edge on all sides. The machine includes a flange having two ends that lie one on top of the other and a lining encircling its longitudinal axis. The flange in the region of one of its ends encloses the cutout in the machine table and is connected sealingly to the table in the region of the peripheral edge. The flange in the region of its other end encloses the weighing frame and is sealingly connected to the weighing frame.

9 Claims, 1 Drawing Sheet

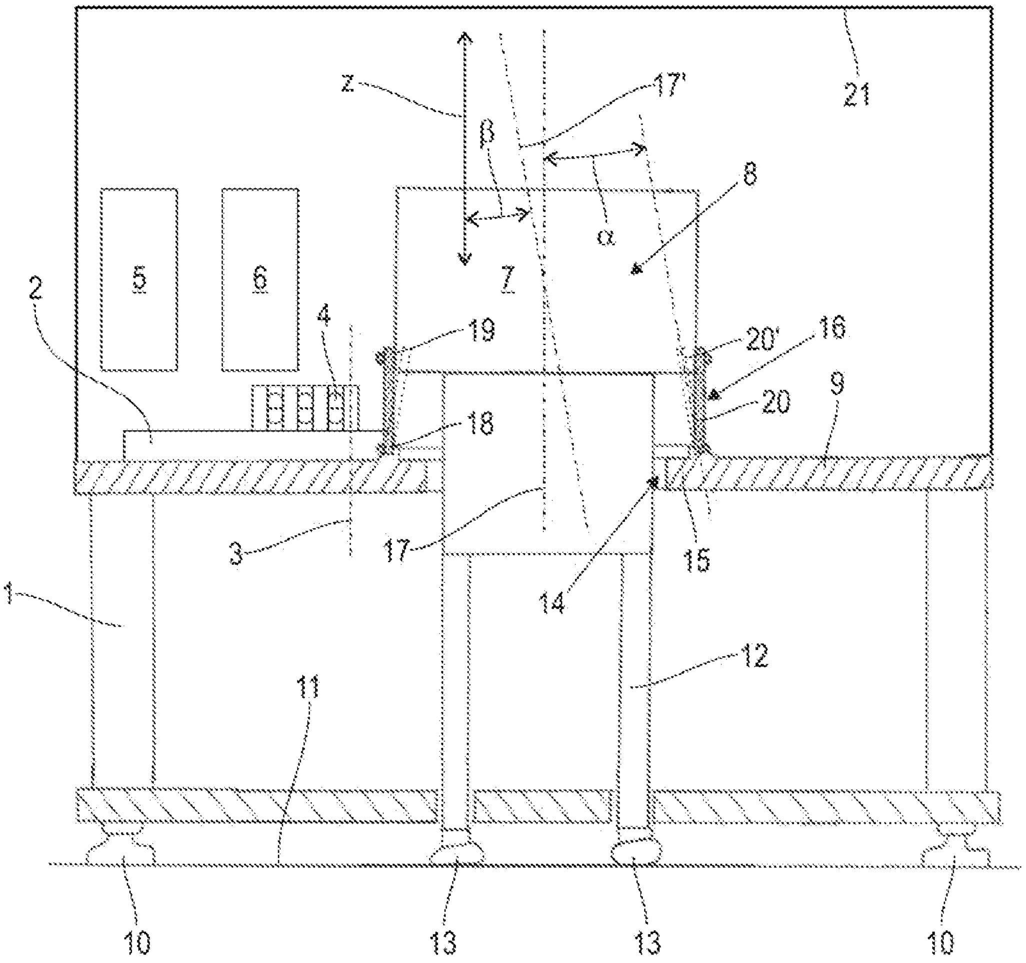
z
17'
21
β
8
α
5
6
7
2
4
19
20'
16
20
9
18
3
17
15
14
1
12
11
10
13
13
10

CAPSULE FILLING MACHINE

CROSS-REFERENCE TO RELATED APPLICATIONS

This application claims priority of European patent application no. 22 174 944.3, filed May 23, 2022, the entire content of which is incorporated herein by reference.

TECHNICAL FIELD

The disclosure relates to a capsule filling machine having a machine frame, on which a rotary plate, having an axis of rotation that runs in the vertical direction, for the transport of capsules that are to be filled to various processing stations is rotatably mounted.

BACKGROUND

Medicinal products, food supplements or the like are provided prevalently in swallowable capsules as dosage form. In the production of these, empty capsules are opened in a capsule filling machine, filled with a specific product and then closed again. In the case of a typical structure of the capsule filling machine, the capsules to be filled are transported in cycles via a rotary plate to various processing stations, where the individual process steps are then carried out. Depending on the quality requirement, the process steps are not limited to the pure filling operation. Rather, increasing use is being made of additional process steps and associated processing stations that serve for quality control.

In the case of critical products, in particular from the pharmaceutical sector, weight control is gaining in importance. In suitable checking steps, the intention is to ascertain whether the individual capsules have been filled correctly with the intended amount of product within specific tolerances. To that end, samples can be taken. However, there is an increasing desire for a 100% in-process control.

Capsules of the type mentioned in the introduction have a total mass in the milligram range. A weighing device for checking the correct capsule filling must therefore be able to achieve reliable weighing results in the stated weight range. This in particular presupposes that disturbance variables, such as air drafts and mechanical vibrations, are to the greatest extent kept away from the weighing device. This can in particular be done when the capsules are weighed in a downstream process step, after the capsule has left the region of the rotary plate.

For specific weighing tasks, such as for example a 100% gross weighing, it is necessary for the capsules to remain in the working region of the rotary plate. As long as the capsules are there, however, the capsule filling machine, in particular owing to its cyclical operation, generates considerable vibrations which make it more difficult for weighing to be done in the immediate vicinity of the rotary plate.

A further challenge is to enable the operation of the capsule filling machine under containment conditions. The working space must be hermetically sealed in order that no active substance exits to the outside during the filling or cleaning operation.

It is an object of the disclosure to provide a capsule filling machine with which quick and precise capsule weighing in the intake region of its rotary plate is possible.

The aforementioned object is, for example, achieved by a capsule filling machine including: a machine frame; a rotary plate for transporting capsules that are to be filled to various processing stations; the rotary plate being rotatably mounted on the machine frame and having an axis of rotation running in a vertical direction; at least one of the various processing stations including a weighing device for capsules; the machine frame having a machine table and a plurality of machine-frame feet for setting down on a floor; the weighing device having a weighing frame including a plurality of dedicated weighing-frame feet for independently setting down on the floor; the machine table having a cutout with a peripheral edge, the weighing device being positioned in the cutout at a distance from the peripheral edge on all sides; a sealing flange extending along a longitudinal axis running at least primarily in a vertical direction; the sealing flange having two ends that lie one on top of the other with respect to the longitudinal axis; a lining encircling the longitudinal axis; the sealing flange in a region of a first of the two ends enclosing the cutout in the machine table and being connected sealingly to the machine table in a region of the peripheral edge; and, the sealing flange in a region of a second of the two ends enclosing the weighing frame and being sealingly connected to the weighing frame.

According to the disclosure, it is provided that the weighing device has a weighing frame, which is provided with dedicated weighing-frame feet for independently setting down on the floor. The machine table has a cutout with a peripheral edge, the weighing device being positioned in the cutout at a distance from its edge on all sides. The capsule filling machine also includes a sealing flange, which extends along a longitudinal axis running at least primarily in the vertical direction, has two ends that lie one on top of the other with respect to the longitudinal axis, and moreover includes a lining encircling the longitudinal axis. The sealing flange in the region of one of its ends encloses the cutout in the machine table, the sealing flange being connected sealingly to the machine table there in the region of the peripheral edge. Furthermore, the sealing flange in the region of its other end encloses the weighing frame and is sealingly connected to the weighing frame there.

Setting the weighing device down on dedicated weighing-frame feet in conjunction with the distance of the weighing device from the edge of the cutout in the machine table on all sides has the effect of largely completely mechanically decoupling the weighing device from the rest of the components of the capsule filling machine. Vibration and impact loading from the cyclical operation of the rotary plate cannot be transmitted to the weighing device or to its weighing frame either directly by the machine table or by the machine frame.

In this respect, a further role is played by the sealing flange, which establishes a sealed connection between the weighing device and the machine table. This prevents material to be filled that has come free from leaving the capsule machine during the filling operation or during the subsequent cleaning operation. Admittedly, a corresponding seal is potentially suitable for the undesired transmission of mechanical disturbance. In a configuration according to the disclosure with a flange form and with an at least approximately vertical longitudinal axis, it has surprisingly been shown that the weighing device remains substantially free of mechanical disturbance variables from the rotary plate operation. This is attributed to the fact that the cyclical movement of the rotary plate about its vertical axis of rotation leads to acceleration forces which act substantially in a horizontal plane and thus radially in relation to the sealing flange. In this plane or direction, the vertically aligned sealing flange can transmit virtually no forces, since it is much more flexible radially in relation to the lining than it is in the direction of its longitudinal axis. In spite of the required sealed attachment of the flange both to the machine table and to the weighing frame, there is still sufficient mechanical decoupling of the weighing device. Consequently, the weighing device can perform the desired weighing operations with high accuracy and a high number of cycles. This includes the option of a 100% in-process control with checking of the weight of all capsules processed on the rotary plate, without it being mandatory to unnecessarily reduce the number of cycles of the rotary plate.

In an embodiment, the lining of the sealing flange runs at an opening angle in relation to the longitudinal axis of the sealing flange. The opening angle is expediently in a range from 0° to 30° inclusive, preferably in a range from 0° to 15° inclusive, and in particular is approximately 0°. This means that the lining can have a for example conical opening in a similar way to a tent, without the desired radial flexibility being significantly adversely affected. In the case of a preferred opening angle of 0°, however, the lateral surface runs parallel to the longitudinal axis of the sealing flange, as a result of which the potential of transmitting disturbance is minimized.

The longitudinal axis of the sealing flange for its part does not necessarily have to run exactly in the vertical direction, but can also have an angle between axes. The angle between axes is expediently in a range from 0° to 30° inclusive, preferably in a range from 0° to 15° inclusive, and in particular is approximately 0°. In these cases, too, the elastic flexibility of the lining remains, in a similar way to the possible opening angle. In the last-mentioned case, the longitudinal axis of the sealing flange runs parallel to the axis of rotation of the rotary plate, this having proven to be optimal for avoiding transmission of mechanical disturbance.

The radial flexibility provided according to the disclosure of the lining can be attributed substantially to a pliability of the lining material and can be brought about in various ways. In an embodiment, the lining is manufactured from an elastically flexible material, and in particular from silicone, rubber or the like. In a further aspect, which can be used as an alternative or in addition, the pliability is brought about by a geometric measure, specifically in that the lining consists of a thin-walled material. In mechanical engineering, a material is referred to as thin-walled when its thickness is so much smaller than the rest of its dimensions that, owing to the low moment of inertia, the pliability is considerably lower than the load-bearing capacity in the plane of the material, as is known for example from thin-walled metal sheets. In the case of a combination of the thin-walled structure with an elastically flexible material, the two effects are added together. In the horizontal plane of the capsule filling machine, a particularly pronounced flexibility and thus also particularly low transmission of mechanical forces and disturbance to the weighing device is achieved.

Depending on the requirement for the mechanical decoupling of the weighing device, the existence of further mechanically active connections between the machine frame and the weighing frame can be tolerated, provided that their transmission of disturbance is not overly pronounced. Preferably, however, the sole mechanical connection between the machine frame and the weighing frame is established by the sealing flange, as a result of which the transmission of disturbance variables is minimized.

BRIEF DESCRIPTION OF DRAWINGS

The invention will now be described with reference to the single FIGURE of the drawings wherein FIG. 1 shows a schematic side view of a capsule filling machine with a mechanically decoupled weighing device and with vertical pliable sealing flanges.

DETAILED DESCRIPTION

FIG. 1 shows a schematic illustration of an embodiment of a capsule filling machine according to the disclosure for capsules 4. The capsules 4 are two-piece capsules, which are provided for swallowing by a consumer. They consist of a top part and a bottom part, which are supplied in a loosely assembled state as empty capsules.

The capsule filling machine includes a machine frame 1, on which a rotary plate 2 is rotatably mounted. Encircling the rotary plate 2 are multiple processing stations 5, 6, 7, which are indicated only schematically here. The capsules 4, which are held in a capsule holder of the rotary plate 2, are moved to the various processing stations 5, 6, 7, as a result of a rotary movement of the rotary plate 2 in stepwise cycles, in order to be filled there. By way of example, here only three processing stations 5, 6, 7 are illustrated. In practice, there is a higher number of them that varies as required. Typically here, as method steps of the filling operation, the empty capsules are opened, filled with metered partial amounts of a desired product, and then closed again. This can be followed by quality control, with rejection of poor capsules. The fully filled capsules that have been found to be acceptable are lastly removed from the capsule holder of the rotary plate 2 and fed for further processing or packaging.

The capsule filling machine is illustrated in the operating configuration, in which it is set down on a flat, horizontal floor 11. A vertical direction z running in the direction of gravity is defined perpendicularly in relation to the horizontal floor 11. The capsule filling machine includes a machine frame 1 with a machine table 9, which is aligned horizontally. The machine frame 1 includes machine-frame feet 10, via which it rests on the floor 11. The stated rotary plate 2 is mounted rotatably on the machine frame 1 in such a way that its axis of rotation 3 runs vertically, that is, in the direction of gravity or vertical direction z. The rotational movements and in particular the rotational accelerations thus take place substantially in a plane parallel to the floor 11 and to the plane of the machine table 9.

One of the processing stations, specifically the processing station 7, is in the form of a weighing device 8, which is indicated here only schematically without details. Here, individual ones or all of the capsules 4 conveyed on the rotary plate 2 can be weighed in the empty state and/or in the filled state. In the embodiment shown, the weighing device 8 serves to perform a 100% gross control for weighing all the capsules 4 in the filled state. To that end, the capsules 4 are moved to the weighing device 8 via the rotary plate 2, removed from their capsule holder, weighed in the weighing device 8 and then returned back to the capsule holder of the rotary plate 2. All of the movements necessary for this, and in particular the acceleration and stopping of the rotational movement of the rotary plate 2, generate mechanical reactions that, as potential disturbance variables of the weighing operation, should be largely kept away from the weighing device 8.

The weighing device 8 has a weighing frame 12, which is provided with dedicated weighing-frame feet 13 and via which it is set down on the floor 11 independently of the machine frame 1. The weight of the weighing device 8 thus rests substantially completely on the weighing-frame feet 13, while the weight of the rest of the capsule filling machine rests substantially completely on the machine-frame feet 10.

The machine table 9 is provided with a cutout 14, the cutout 14 having a peripheral edge 15. The weighing device 8 is positioned within this cutout 14 in such a way that it is at a distance from the edge 15 on all sides. Apart from a sealing flange 16, which is described later on, there is thus no direct contact between the machine table 9 or other parts of the machine frame 1 and the weighing device 8.

The entire working space, including the processing stations 5, 6, 7, is hermetically enclosed in order to avoid the egress of material to be filled that has come free, this applying in a similar way to the ongoing filling process and to a subsequent cleaning process. To that end, the machine table 9 together with an indicated enclosure 21 forms a sealingly closed working space. In order to also provide the required sealing in the region of the weighing device 8 and the cutout 14, the capsule filling machine includes a sealing flange 16. The sealing flange 16 has a lining 20 which encircles the cutout 14 and the weighing frame 12, set therein, of the weighing device 8. Moreover, the lining 20 runs around a longitudinal axis 17, along which the sealing flange 16 extends. According to the disclosure, the longitudinal axis 17 of the sealing flange 16 runs primarily in the vertical direction z. In the embodiment shown, it is at least approximately exactly vertical, that is, aligned in the vertical direction z. However, it may also have an inclination, corresponding to the variant denoted by 17', with an associated angle between axes β between the inclined longitudinal axis 17' and the vertical direction z expediently being in a range from 0° to 30° inclusive, and preferably in a range of 0° to 15° inclusive. In the vertical alignment of the longitudinal axis 17 that is shown, the angle between axes β=0°. In the embodiment shown, the lining 20 of the sealing flange 16 runs around the longitudinal axis 17 such that its distance from the longitudinal axis 17 does not change along the vertical direction z. Within certain limits, however, a distance that varies in the vertical direction z may also be expedient, it then being the case that a lining 20' that runs correspondingly in the manner of a cone runs at an opening angle α in relation to the longitudinal axis 17. The opening angle α is preferably in a range from 0° to 30° inclusive, and in particular in a range of 0° to 15° inclusive. In the embodiment shown, the opening angle α of the lining 20=0°.

The sealing flange has two ends 18, 19, which lie one on top of the other with respect to the longitudinal axis 17. In the region of its lower end 18, the sealing flange 16 encloses the cutout 14 and is sealingly connected to the machine table 9 there, adjacent to the encircling edge 15. In the region of its opposite, upper end 19, the sealing flange 16 encloses the weighing frame 12 and is sealingly connected to it there. Of course, an inverse arrangement may also be expedient, in which the upper end 19 adjoins the machine table 9, while the lower end 18 is connected to the weighing frame 12. In any case, a sealed connection between the weighing device 8 and the machine table 9 is established via the sealing flange 16, with the result that the stated working space is hermetically closed overall in spite of the cutout 14. The sealing flange is the sole mechanical connection between the machine frame 1 and the weighing frame 12.

The distance of the weighing frame 12 from the edge 15 of the cutout 14 on all sides was mentioned as first measure for the mechanical decoupling of the weighing device 8 from the machine frame 1. As further decoupling measure, the sealing flange must satisfy various requirements. Part of this, first of all, are the limits for the opening angle α and the angle between axes β that were already set out above. Furthermore, the lining 20 of the sealing flange 16 has a pliable configuration. The term "pliable" means that, in the event of loading applied transversely in relation to the vertical direction z owing to bending deformation, the lining 20 yields to a great enough extent that no relevant mechanical disturbances are transmitted to the weighing device 8 in the horizontal direction. To that end, the lining 20 consists of an elastically flexible material, in the embodiment shown silicone being selected. However, rubber or another elastomer may also be expedient. Moreover, the lining 20 has a thin-walled configuration measured in its remaining dimensions, with the result that corresponding radial flexibility is brought about already on the grounds of geometry.

It is understood that the foregoing description is that of the preferred embodiments of the invention and that various changes and modifications may be made thereto without departing from the spirit and scope of the invention as defined in the appended claims.

The invention claimed is:

1. A capsule filling machine comprising:
- a machine frame;
- a rotary plate for transporting capsules that are to be filled to various processing stations;
- said rotary plate being rotatably mounted on said machine frame and having an axis of rotation running in a vertical direction;
- at least one of said various processing stations including a weighing device for capsules;
- said machine frame having a machine table and a plurality of machine-frame feet for setting down on a floor;
- said weighing device having a weighing frame including a plurality of dedicated weighing-frame feet for independently setting down on the floor;
- said machine table having a cutout with a peripheral edge, said weighing device being positioned in the cutout at a distance from said peripheral edge on all sides;
- a sealing flange extending along a longitudinal axis running at least primarily in a vertical direction;
- said sealing flange having two ends that lie one on top of the other with respect to the longitudinal axis;
- a lining encircling the longitudinal axis;
- said sealing flange in a region of a first of said two ends enclosing said cutout in said machine table and being connected sealingly to said machine table in a region of said peripheral edge; and,
- said sealing flange in a region of a second of said two ends enclosing said weighing frame and being sealingly connected to said weighing frame.

2. The capsule filling machine of claim 1, wherein said lining of said sealing flange runs at an opening angle α in relation to the longitudinal axis; and, said opening angle α lies in a range from 0° to 30° inclusive.

3. The capsule filling machine of claim 1, wherein said lining of said sealing flange runs at an opening angle α in relation to the longitudinal axis; and, said opening angle α lies in a range from 0° to 15° inclusive.

4. The capsule filling machine of claim 1, wherein the longitudinal axis of said sealing flange runs at an angle between axes β in relation to the vertical direction; and, said angle between axes β lies in a range from 0° to 30° inclusive.

5. The capsule filling machine of claim 1, wherein the longitudinal axis of said sealing flange runs at an angle between axes β in relation to the vertical direction; and, said angle between axes β lies in a range from 0° to 15° inclusive.

6. The capsule filling machine of claim 1, wherein said lining is made from an elastically flexible material.

7. The capsule filling machine of claim 1, wherein said lining is made from silicone or rubber.

8. The capsule filling machine of claim 1, wherein said lining consists of a thin-walled material.

9. The capsule filling machine of claim 1, wherein said sealing flange establishes a sole mechanical connection between said machine frame and said weighing frame.

* * * * *